(12) United States Patent
Kudoh et al.

(10) Patent No.: US 7,583,461 B2
(45) Date of Patent: Sep. 1, 2009

(54) DEFECT REGISTRATION METHOD OF MAGNETIC DISK, AND MAGNETIC DISK DRIVE

(75) Inventors: Masaki Kudoh, Tokyo (JP); Toshiaki Satoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 31 days.

(21) Appl. No.: 11/223,068

(22) Filed: Sep. 8, 2005

(65) Prior Publication Data

US 2006/0056088 A1 Mar. 16, 2006

(30) Foreign Application Priority Data

Sep. 15, 2004 (JP) .............................. 2004-267718

(51) Int. Cl.
*G11B 5/09* (2006.01)
*G11B 27/36* (2006.01)
*G06F 11/00* (2006.01)
*H05K 10/00* (2006.01)

(52) U.S. Cl. ................................ 360/53; 360/31; 714/8; 714/42; 714/54

(58) Field of Classification Search ........................ None
See application file for complete search history.

(56) References Cited

U.S. PATENT DOCUMENTS 6,154,858 A * 11/2000 Ottesen et al. ................ 714/42
6,223,303 B1 * 4/2001 Billings et al. ................. 714/8
6,281,676 B1 * 8/2001 Ottesen et al. ............... 324/212
7,139,145 B1 * 11/2006 Archibald et al. ............. 360/53
2002/0122266 A1 * 9/2002 Andoh et al. ................. 360/69
2002/0181133 A1 * 12/2002 Koshkina et al. ............. 360/53
2004/0100715 A1 * 5/2004 Smith et al. .................... 360/69
2004/0158769 A1 * 8/2004 Park ............................. 714/7

FOREIGN PATENT DOCUMENTS

JP 07-334933 12/1995
JP 2001-351201 12/2001

* cited by examiner

*Primary Examiner*—Andrew L Sniezek
(74) *Attorney, Agent, or Firm*—Townsend and Townsend and Crew LLP; Patrick Duncan

(57) ABSTRACT

Embodiments of the present invention provide a defect registration method for performing defect registration of sectors on a magnetic disk. In one embodiment, a rectangular detection window is applied to each defect sector. A threshold value of the detection window is set at 2. In addition, an additional sector group is defined for the detection window. The additional sector group is a target of the defect registration if the number of defect sectors exceeds the threshold value. The additional sector group covers sectors that are not judged as defects in defect detection inspection, but that are expected to be potentially defective. Even if the detection window is applied to a defect sector, an additional sector group is not generated. However, if the detection window is applied to a defect sector, an additional sector group is generated. If the detection window is applied to a defect pattern, an additional sector group is generated.

18 Claims, 9 Drawing Sheets

Circumferential direction of disk
(A)

Circumferential direction of disk
(B)

■ Defect sector
▨ Additional sector
⌐ ┐ Normal sector

Circumferential direction of disk (A)

Circumferential direction of disk (B)

■ Defect sector
▨ Additional sector
▭ Normal sector (A)

(B)

■ Defect sector
▨ Additional sector
⬚ Normal sector

Radial direction of disk

Circumferential direction of disk

DEFECT REGISTRATION METHOD OF MAGNETIC DISK, AND MAGNETIC DISK DRIVE

CROSS-REFERENCES TO RELATED APPLICATIONS

This application claims priority from Japanese Patent Application No. JP2004-267718, filed Sep. 15, 2004, the entire disclosure of which is incorporated therein by reference.

BACKGROUND OF THE INVENTION

The present invention relates to a technology of how to perform defect registration of a data sector located on a magnetic disk, and more particularly to a technology for correctly registering, in a simple way, a data sector that is potentially defective.

As for the magnetic disk that is a recording medium of a magnetic disk drive, a plurality of data tracks (hereinafter merely referred to as "track") are concentrically defined on each recording surface by servo data, and a plurality of data sectors (hereinafter merely referred to as "sector" unless it is particularly necessary otherwise) are defined in each track in the circumferential direction. A sector is a smallest unit of writing data to the magnetic disk, and is defined, for example, as a storage block having a length of 512 bytes. In a manufacturing process of the magnetic disk drive, a bad sector which has been detected by carrying out a read/write test for all sectors is judged to be a defect sector, and its address is then registered in a primary defect map (hereinafter referred to as "PDM") to disallow the use of the defect sector. A sector in which a defect occurs after a user starts using the magnetic disk is registered in a reassign defect map (hereinafter referred to as "RDM") so that an address of the defect sector is reassigned to an alternate sector which is prepared beforehand in a specified area of the magnetic disk.

A patent document 1 (Japanese Patent Laid-Open No. 2001-23310) discloses the configuration of PDM in which consecutive defect sectors are registered. A patent document 2 (Japanese Patent Laid-Open No. Hei 7-334933) discloses the technology for judging whether or not a scar occurs in the radial direction on a disk. A patent document 3 (Japanese Patent Laid-Open No. 2001-351201) discloses the technology for detecting a random defect and a vertically oriented defect with few errors without inspecting all tracks.

BRIEF SUMMARY OF THE INVENTION

In a manufacturing process of magnetic disks, a scar occurring on part of a recording surface, some unsuccessful formation process of a magnetic layer, or the like, results in the formation of an area in which data read/write cannot be properly performed. Sectors located in this area become defect sectors. The defect sectors are often distributed as a pattern in which the defect sectors consecutively appear in an arbitrary direction on the magnetic disk. The probable causes of such distribution include physical accesses made to remove foreign materials from a recording surface in the manufacturing process of magnetic disks, and the contact of a head/slider with a rotating magnetic disk. Therefore, there is a high possibility that the same probable causes would act on sectors in proximity to the sector in which a defect has been detected in a defect detection test such as a read/write test, and consequently that those sectors are potentially defective even if an extent of the defectiveness is not enough to be detected as a defect in the read/write test. Even if potentially defective sectors are left as they are at a shipping stage and are registered in a RDM after defects become obvious on the user side, no problem of data read/write arises in appearance.

However, if data is stored in an alternate sector using the RDM, the head/slider cannot access sectors in the order of the rotation of the magnetic disk. Accordingly, data read/write is often forced to wait for the rotational latency, resulting in the increase in access time, which is not desirable. Therefore, it is desirable that defect registration of not only defect sectors, but also potential defect sectors existing around the defect sectors, be performed in the PDM before shipment. Moreover, because potential defect sectors may bring about a state in which stored data cannot be read out, it is desirable, also from the viewpoint of the improvement in reliability of the stored data, that the defect registration be performed before shipping.

A range within which potential defect sectors are expected to exist around defect sectors should include only sectors that are potentially defective; in other words, normal sectors should be excluded from the range. Otherwise, there is a possibility that the storage capacity of a magnetic disk will be insufficient as a whole. In addition, if the number of sectors, the defect registration of which is to be performed, increases too much, it is expected that a mechanism for writing/reading data, including a magnetic disk or a head, has an unexpected cause of the defects. The magnetic disk drive in question, therefore, may also be judged to be a defect unit in the manufacturing process. If such a judgment technique is adopted, the production yields decrease as a result of performing the defect registration of sectors more than necessary.

Accordingly, when performing the defect registration of sectors, it is necessary to achieve the defect registration of potential defect sectors without omission, and not to perform the defect registration of normal sectors. In the meantime, the extraction of defect sectors, the judgment about potential defect sectors, and the defect registration of sectors may be performed as a self test in a testing process after the assembling of a magnetic disk drive. In the self test, a processor of the magnetic disk drive executes an inspection program without using dedicated test equipment. In this case, because the throughput of the processor and the memory capacity are limited, it is not possible to make complicated calculations. Further, the length of time which can be spent on the defect registration is also limited.

The present invention has been made to solve the problems, and a feature of the present invention is to provide a method for performing with high accuracy the defect registration of sectors on a magnetic disk. Another feature of the present invention is to provide a method for performing the defect registration by simple calculations. Still another feature of the present invention is to provide a magnetic disk drive capable of executing the defect registration.

According to the present invention, there is provided a defect registration method for performing defect registration of sectors located on a magnetic disk, the method including the steps of: extracting a plurality of defect sectors from the magnetic disk; calculating the total number of defect sectors located within a specified range including the defect sector, and performing the defect registration of addresses of sectors existing around the specified range, and addresses of sectors existing within the specified range, if the calculated number of defect sectors is greater than or equal to a specified value.

Defect sectors can be extracted from among data sectors in a data area by performing for all sectors a defect detection test such as a read/write test, and then by comparing read data with write data. The defect detection test may also include inspection of a defect of servo data, the inspection being achieved by checking whether or not the servo data can be read out, or by checking whether or not a head can be positioned at a track within a given period of time by use of servo data. This is because a defect of servo data is similar to a defect of a sector from the viewpoint that it is not possible to write/read to/from a corresponding sector.

The specified range including the defect sector can be configured as a detection window that is formed as a sector area constituted of the specified number of sectors. An additional sector group is defined for the detection window. A plurality of sectors existing around the specified range can be configured as an additional sector group constituted of a plurality of sectors, the additional sector group being defined for the detection window. The additional sector group is constituted of sectors existing around the detection window, and sectors in the detection window excluding defect sectors. Because all additional sectors included in the detection window are targets of the defect registration, all sectors in the detection window may also be treated as additional sectors.

An address of each sector constituting the additional sector group is associated with the detection window. Therefore, if a location of the detection window on the magnetic disk is determined as a result of aligning the detection window with any one of the defect sectors, an address of each additional sector defined for the detection window in question is also determined. The detection window is provided with a specified threshold value for the number of defect sectors included in the detection window. If the number of defect sectors exceeds the threshold value, an additional sector group is generated, and its address can be identified. Applying a detection window to each defect sector makes it possible to generate, all over the magnetic disk, additional sector groups associated with the detection window, the threshold value of which is exceeded, and to calculate addresses of the additional sector groups on the magnetic disk so that the additional sector groups as well as the defect sectors can be treated as targets of the defect registration.

The detection window is formed as a sector area constituted of the specified number of sectors, for example: a sector area, the width of which is one sector, the sector extending in the radial direction on the magnetic disk; a sector area, the width of which is one sector, the sector extending in the circumferential direction on the magnetic disk; a rectangular sector area; or the like. The threshold value of the detection window is used to make a judgment as to whether or not a potential defect sector exists around a defect sector. Any kind of address may be adopted as an address of a sector, the defect registration of which is to be performed, so long as the address can identify a location of the sector on the magnetic disk. For example, an absolute block address (hereinafter referred to as "ABA"), a logical block address (hereinafter referred to as "LBA"), and the like, can be used.

The method which uses a detection window to perform the defect registration can be implemented by simple calculations. To be more specific, as a result of applying the detection window to an address of each defect sector, if a threshold value is exceeded, the defect registration is performed as an address of an additional sector group on the magnetic disk, the address of the additional sector group being defined for the detection window. Accordingly, a load of a processor executing a program of this method is relatively light, and the amount of memory resource consumed is not so large. The defect registration method according to the present invention, therefore, can be performed in a short period of time by executing a defect registration program in the magnetic disk drive, which makes it possible to increase the production yields.

According to the present invention, it is possible to provide a method for performing with high accuracy the defect registration of sectors on a magnetic disk. Moreover, it is possible to provide a method for performing the defect registration by simple calculations. Furthermore, it is possible to provide a magnetic disk drive capable of executing the defect registration.

DETAILED DESCRIPTION OF THE INVENTION

Definition

To begin with, technical terms used in this specification will be described. The term "defect sector" denotes a sector that is judged to be unusable in a defect detection test such as a read/write test. The term "potential defect sector" denotes a sector that is not judged to be unusable in a defect detection test, but that exists around a defect sector. Accordingly, under the influence of the same cause as that of the defect sector, the potential defect sector is expected to have inferior performance as a write area. The term "additional sector group" denotes a plurality of sectors in which an address associated with a detection window according to the present invention is defined as a sector equivalent to a potential defect sector. The term "defect registration" is to register addresses of defect sectors and those of additional sectors in a storage medium included in a magnetic disk drive before shipment so as to disallow users to access these addresses.

Patterns of Defect Sector and Potential Defect Sector

Figure 1:
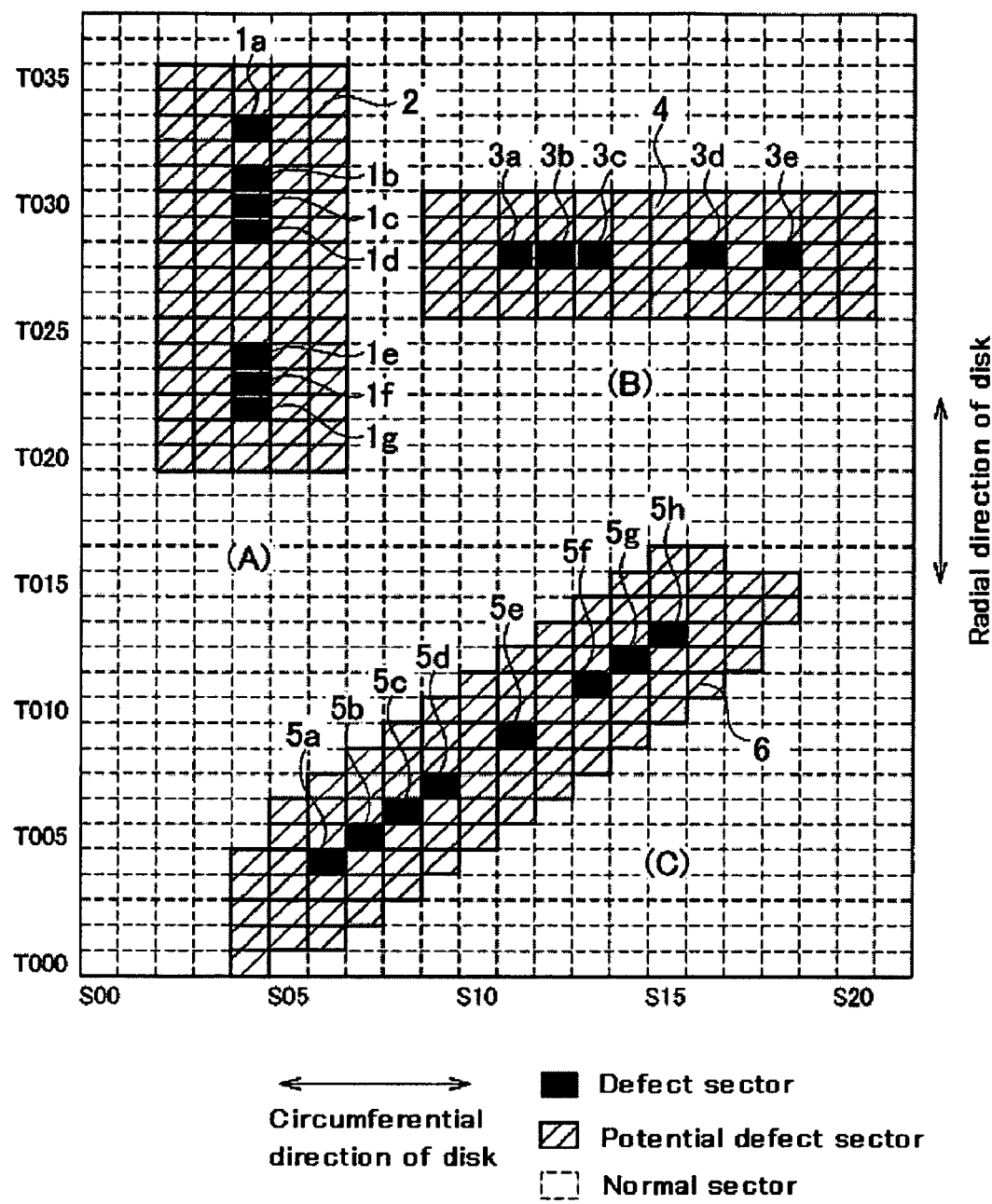
FIGS. 1(A) through 1(C) are a diagram illustrating examples of typical patterns of defect sectors, and examples of potential defect sectors expected to exist around the defect sectors.

FIGS. 1(A) through 1(C) are diagrams each illustrating a typical pattern example of defect sectors detected on a magnetic disk, and of potential defect sectors that are expected to exist around the defect sectors. In FIGS. 1(A) through 1(C), each mesh corresponds to one sector; a black sector indicates a defect sector; a sector shaded with oblique lines indicates a potential defect sector, and a white sector indicates a normal sector. Incidentally, a number in the circumferential direction of the magnetic disk is a sector number, whereas a number in the radial direction is a truck number. The sector number and the truck number are given as a matter of convenience so that the location of a sector can be identified in FIGS. 1(A) through 1(C). In the present invention, a magnetic disk can use any kind of method to identify the location of the sector and the location of a track. If there are a plurality of recording surfaces on the magnetic disk, the truck number is equivalent to a cylinder number that is given to the aggregate of the same truck number of each recording surface.

Among sectors that have been judged to be normal as a result of a defect detection test such as a read/write test, there is a sector that includes a potential defect. This sector is called a potential defect sector in the present invention. The normal sectors, therefore, are equivalent to sectors other than the defect sectors and the potential defect sectors. If a plurality of defect sectors exist at locations in proximity to one another on a magnetic disk, a cause of the defect is often included not only in the defect sectors in question but also in sectors existing around the defect sectors, which is known as a result of verification. For example, when dust is wiped away from a surface of a magnetic disk, a linear scar may be made in a given direction. In this case, even if some sectors are not detected as defect sectors by the defect detection test, there is a possibility that the same cause will influence sectors existing along the traveling direction of the linear scar. In like manner, there is also a possibility that the same cause will influence sectors existing in the cross direction of the linear scar. Thus, the potential defect sectors exist around the plurality of defect sectors located in proximity to one another.

FIG. 1(A) illustrates an example in which as a result of a scar made in the radial direction of the magnetic disk, sectors 1*a* through 1*g* having truck numbers T022 through T024, T029 through T031, and T033, all of which have a sector number S04, are detected as defect sectors. A potential defect sector group 2 constituted of a plurality of sectors is expected to exist around the defect sectors 1*a* through 1*g*. FIG. 1(B) illustrates an example in which as a result of a scar made in the circumferential direction of the magnetic disk, sectors 3*a* through 3*e* having sector numbers S11 through S13, S16, S18, all of which have a truck number T028, are detected as defect sectors. A potential defect sector group 4 is expected to exist around the defect sectors 3*a* through 3*e*. FIG. 1(C) illustrates an example in which as a result of a scar made in the slanting direction of the magnetic disk, sectors 5*a* through 5*h* are detected as defect sectors. A potential defect sector group 6 is expected to exist around the defect sectors 5*a* through 5*h*.

In general, it is not possible to strictly identify a range of a potential defect sector group existing around defect sectors. It is because a relatively long period of time is required until a defect of a potential defect sector becomes obvious, other accidental factors cause a defect in a normal sector, or it is difficult to quantitatively evaluate the extent of a defect. However, in actuality, the reliability of the magnetic disk is achieved by treating these defect sectors based on the assumption that a plurality of potential defect sectors exist around the defect sectors as described above. Empirically, if the defect registration is performed on the assumption that a range of potential defect sectors around the defect sector is approximately from 1 to 3 sectors, it is possible to harmonize factors including the quality assurance of the magnetic disk, the time spent for the defect registration, and the reservation of the capacity of the magnetic disk.

Principles of the Defect Registration of a Sector

Figure 2:
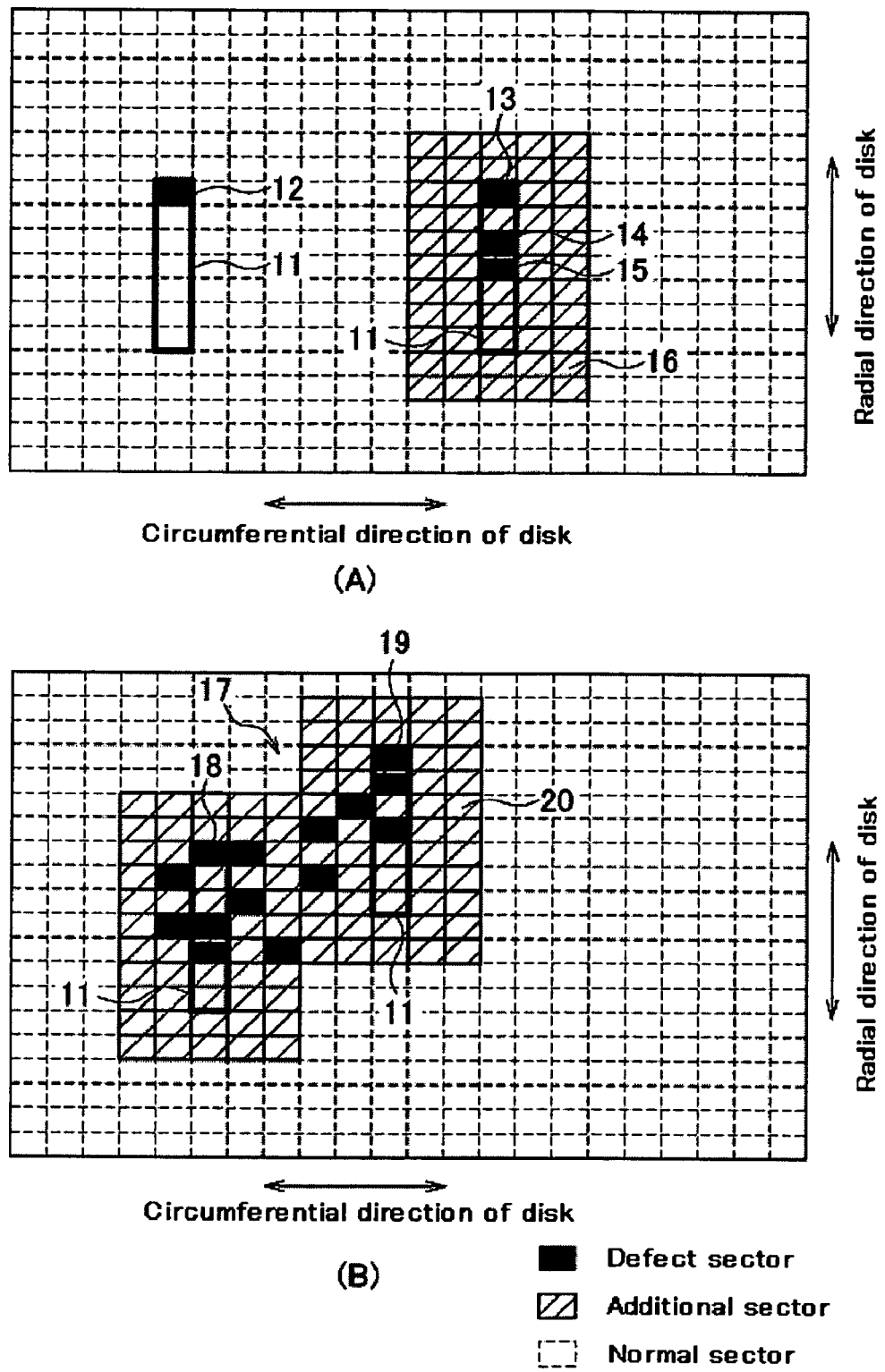
FIGS. 2(A) and 2(B) are diagrams each illustrating a configuration of a detection window, and principles of how to generate an additional sector group by applying the detection window to a defect sector.
Figure 3:
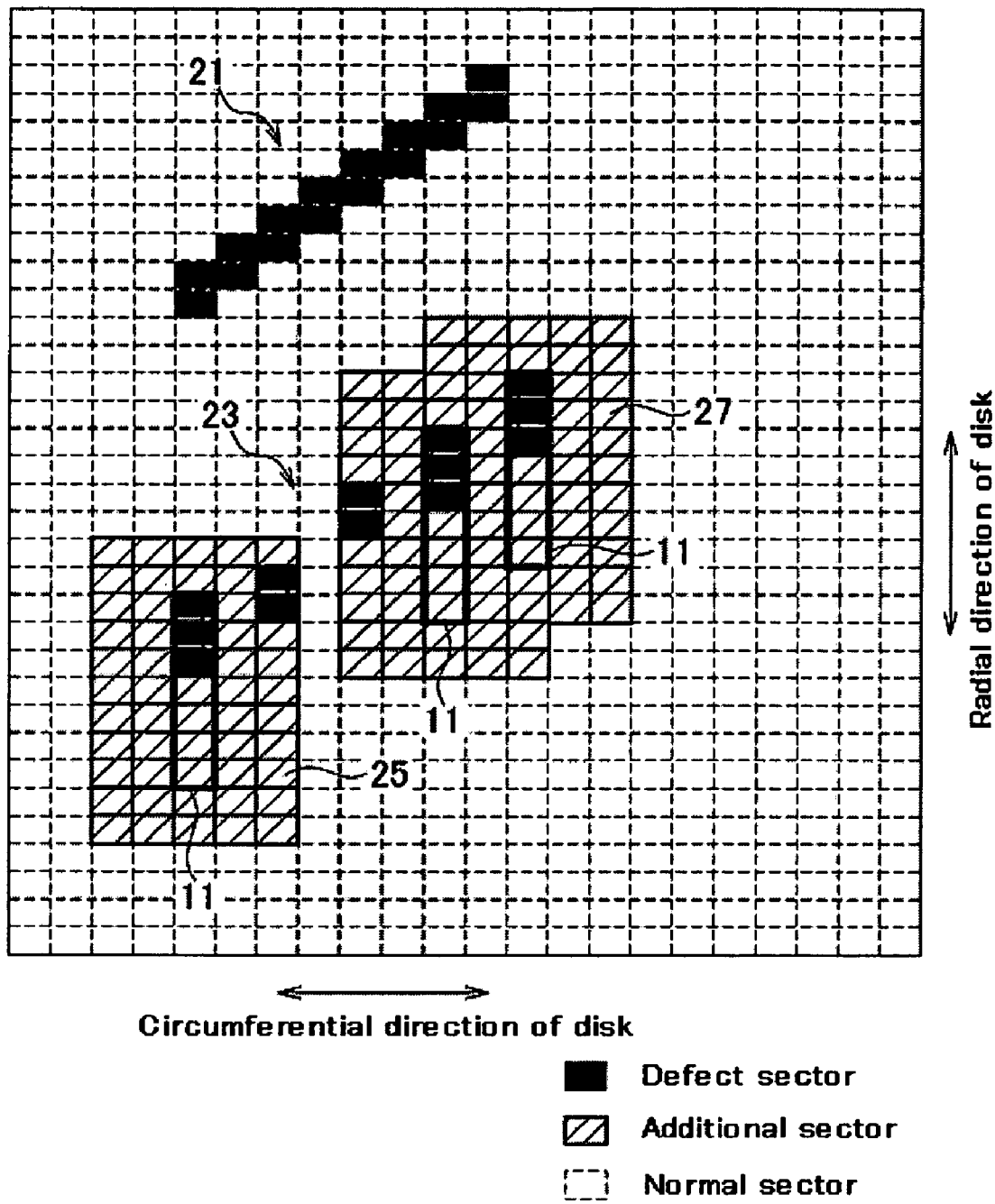
FIG. 3 is a diagram illustrating another example of a defect pattern of sectors located on the magnetic disk.
Figure 4:
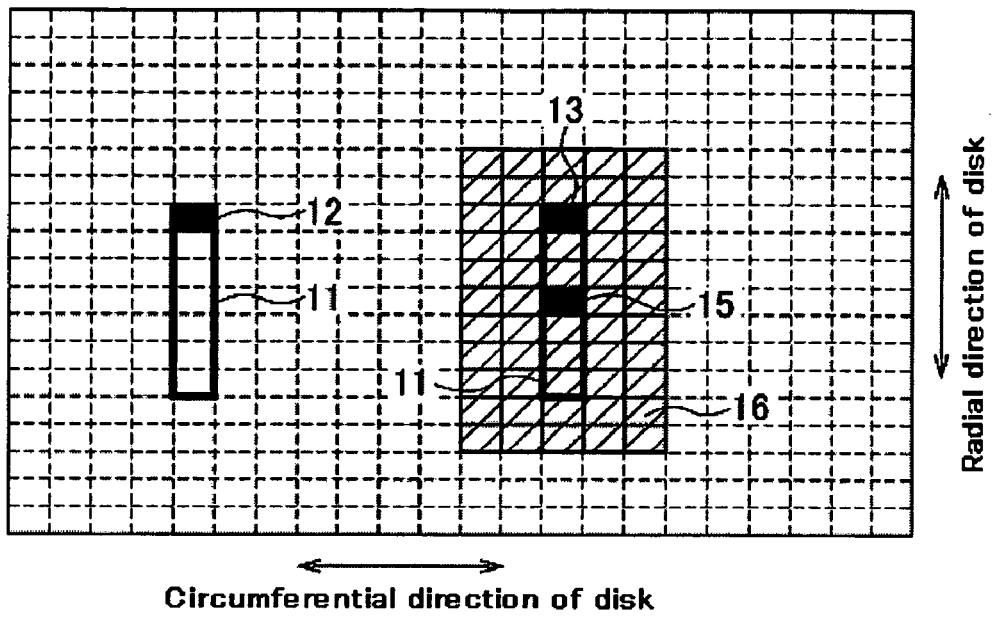
FIGS. 4(A) and 4(B) are diagrams each illustrating an example in which a threshold value of a detection window is reduced for the defect pattern shown in FIGS. 2(A) and 2(B) to generate an additional sector group.
Figure 4:
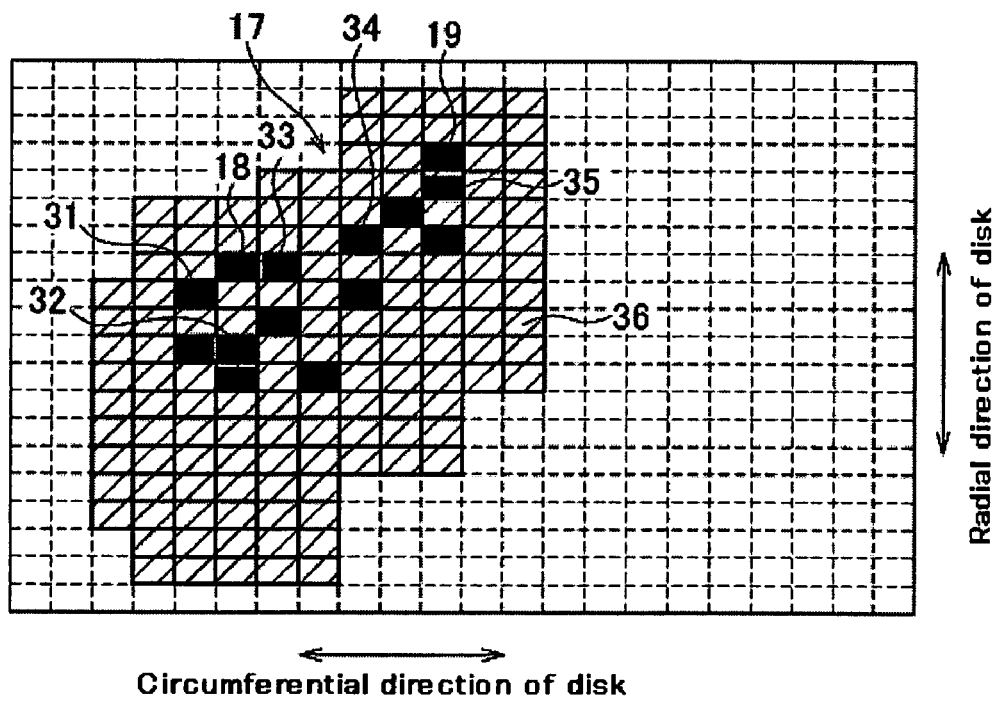
Figure 5:
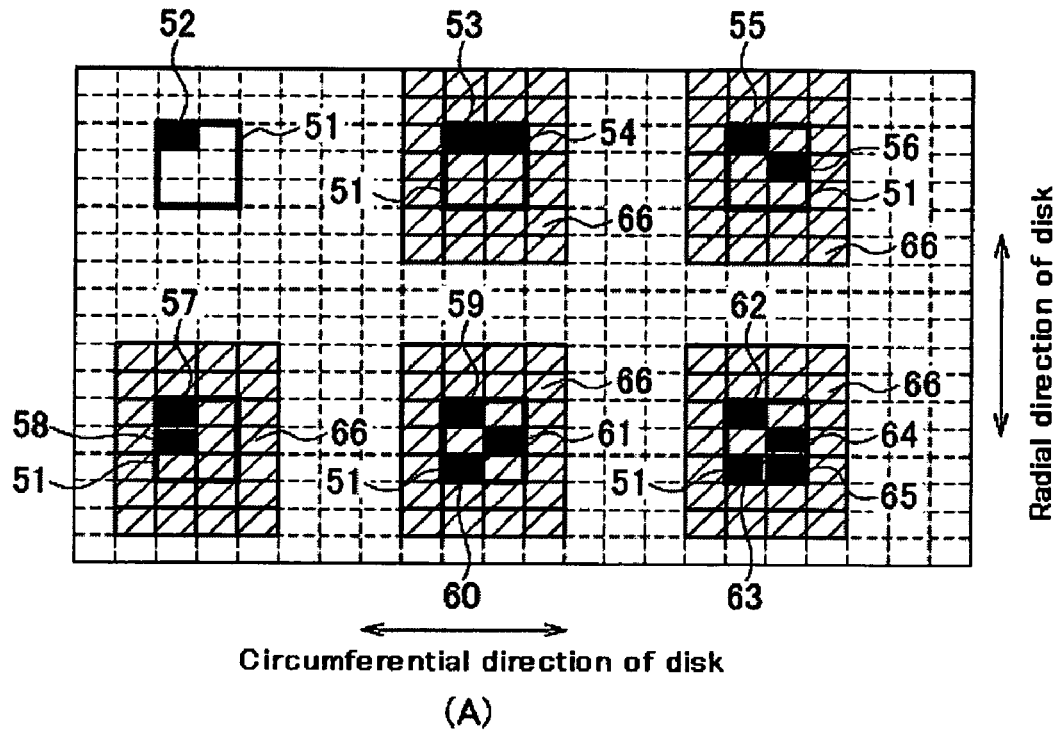
FIGS. 5(A) and 5(B) are diagrams each illustrating an embodiment of a rectangular detection window.
Figure 5:
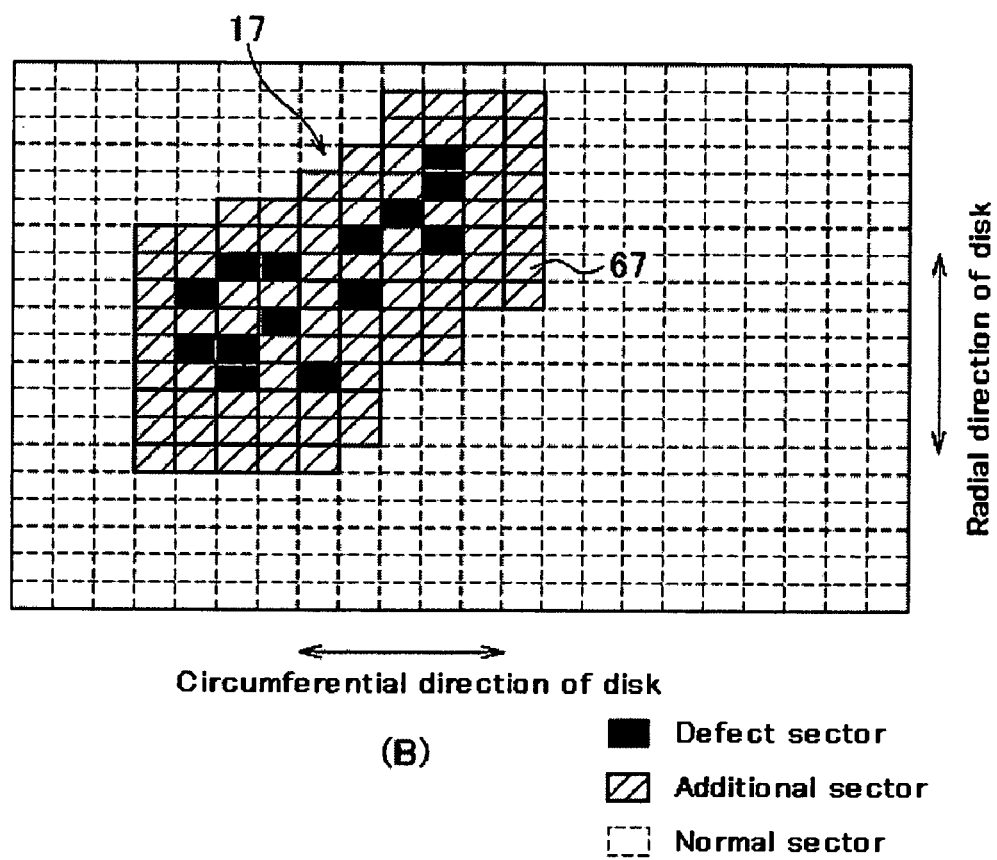

Next, principles of how to perform the registration of sectors will be described with reference to FIGS. 2(A), 2(B), and FIG. 3. With the object of demarcating sectors, the defect registration of which is to be performed, an embodiment of the present invention uses a detection window that is formed of a sector area constituted of a plurality of sectors. FIGS. 2(A) and 2(B) are diagrams each illustrating a configuration of a detection window, and principles of how to generate an additional sector group by applying a detection window 11 to a defect sector. In FIGS. 2(A) and 2(B), each mesh corresponds to each sector of a magnetic disk; a black sector indicates a defect sector; a sector shaded with oblique lines indicates an additional sector, and a white sector indicates a normal sector. The normal sectors are equivalent to sectors other than the defect sectors and the additional sectors. How to indicate sectors in FIGS. 3 through 6 are also the same as that in FIGS. 2(A) and 2(B).

It can be thought that excluding an array of sectors in a boundary part of a zone when applying a method in which a plurality of zones are set in the radial direction of the magnetic disk and the number of sectors per track is changed between zones, an array of sectors in the radial direction of the magnetic disk lines up on a straight line extending from the center of the magnetic disk toward the outside. An array of sectors in the circumferential direction of the magnetic disk lines up on the same track. In FIGS. 2(A) and 2(B), the upward direction is the direction of the outermost circumferential track, and the downward direction is the direction of the innermost circumferential track.

The detection window 11 is a software area constituted of the specified number of sector areas. The detection window 11 is applied to a defect sector extracted by a defect detection test so that a judgment is made as to whether or not there is a potential defect sector around the defect sector in question. The detection window 11 shown in FIG. 2(A) is configured as an area constituted of a plurality of sectors that line up adjacently in a single row in the radial direction of the magnetic disk. What is set in the detection window 11 is a threshold value used to judge whether or not sectors around the defect sector to be applied is stored as an additional sector group. In this embodiment, the threshold value of the detection window 11 is set at 3. Even if the detection window is configured as an area constituted of seven sectors which line up adjacently on the same arbitrary track, characteristics thereof become the same as those of the detection window 11.

Paying attention to an additional sector group 16, an address relative to the detection window is defined as a sector area constituted of: sectors in a specified area provided around the detection window 11, and a plurality of sectors included in the detection window 11 but excluding the defect sectors. The additional sector group 16 is equivalent to sectors, the defect registration of which is to be performed. Therefore, ideally, a range of the additional sector group 16 should exactly agree with that of the potential defect sectors. In this embodiment, with the object of defining the additional sector group 16 for the detection window 11, two sectors are set on both sides in the radial direction of the magnetic disk, and two sectors are set on both sides in the circumferential direction of the magnetic disk, for the detection window 11 to form a rectangular area surrounding the set sectors. The additional sector group 16 is defined, with a relative address relative to the detection window, as a sector area formed by excluding the defect sectors included in the detection window 11 from a plurality of sectors included in the rectangular area. In another case, the additional sector group 16 may also be defined as all sectors included in the whole rectangular area that includes the detection windows. It is because the additional sector group 16 and the defect sectors in the detection window are treated as target sectors of the defect registration.

In order to make a judgment as to whether or not an additional sector group is to be generated around the defect sectors by applying a detection window, the detection window 11 is aligned with a defect sector 12 or a defect sector 13 as a target. When aligning the detection window 11 with a defect sector, a specific sector in the detection window (for example, a sector on the outermost circumferential track side of the detection window as shown in FIG. 2(A)) is aligned with a defect sector. However, which sector constituting the detection window 11 to be aligned with the defect sector can be arbitrarily set.

The number of defect sectors included in the detection window 11 is calculated after the alignment. If it is judged that the number of defect sectors included is greater than or equal to a threshold value (in this case, 3 or more), the additional sector group 16 is generated as a target of the defect registration. If a location of the detection window 11 on the magnetic disk is determined, a relative address of the additional sector group 16 relative to the detection window 11 is converted into an address on the magnetic disk, and thereby it is possible to obtain an address of each additional sector on the magnetic disk. In a left part of FIG. 2(A), when aligning the detection window 11 with a defect sector 12, the number of defect sectors included in the detection window 11 is only one. Accordingly, an additional sector group is not generated. In a right part of FIG. 2(A), when aligning the detection window 11 with a defect sector 13, the number of defect sectors included in the detection window 11 is three. Accordingly, an additional sector group 16 is generated.

FIG. 2(B) is a diagram illustrating a state in which the detection window 11 is applied to a defect pattern 17 constituted of a plurality of sectors scattered on the magnetic disk to generate an additional sector group 20. The detection window 11 is aligned with all defect sectors included in the defect pattern 17 one by one in order, and the number of defect sectors included is calculated. If the number of defect sectors exceeds a threshold value, an address of an additional sector group is stored. An address of each additional sector constituting the additional sector group 20 is identified by a truck number and a sector number on the magnetic disk.

When applying the detection window 11 to all defect sectors, as a result of aligning the detection window 11 with defect sectors 18, 19, it is found out that three defect sectors are included for each alignment with the defect sectors 18, 19. Accordingly, the additional sector group is generated. In this case, it can be said that the defect sector 18 and the defect sector 19 are seeds of the detection window 11. The additional sector group 20 is generated by combining an additional sector group for the defect sector 18 with an additional sector group for the defect sector 19. The generation of the additional sector group 20 means that an address of each additional sector existing around the defect sectors 18, 19, which become seeds, is identified. If an address of an additional sector generated by applying the detection window 11 overlaps a defect sector or an additional sector, which has already been identified, it is not necessary to store the address again.

In FIG. 2(B), an additional sector existing at a location which overlaps a defect sector is shown as a defect sector. However, because both the defect sector and the additional sector are targets of the defect registration, displaying this as an additional sector produces no difference in result. Because defect sectors other than the defect sectors 18, 19 do not become a seed for generating an additional sector, even if the detection window 11 is aligned with them, an additional sector group is not generated. For the defect pattern 17 of sectors shown in FIG. 2(B), the detection window 11 generates the additional sector group covering potential defect sectors.

FIG. 3 is a diagram illustrating another example of a defect pattern of sectors located on the magnetic disk. A defect pattern 21 is an array of defect sectors found in a case where there is a scar oblique to the radial direction of the magnetic disk. Two defect sectors are adjacent to each other in the radial direction while shifting one by one in the radial direction of the magnetic disk. Even if the detection window 11 is applied to all defect sectors of the defect pattern 21, no detection window includes three defect sectors or more, which means that there is no defect sector as a seed. Therefore, an additional sector group is not generated for the defect pattern 21. However, the defect pattern 21 is formed as an array of a plurality of defect sectors that are adjacent to one another. Therefore, it is thought that some external factor acts on this area of the magnetic disk. There is a possibility that a potential defect sector caused by the same factor will be included also in sectors located around the defect pattern 21. Accordingly, it is necessary to generate an additional sector group around the defect pattern 21.

When applying the detection window 11 to the defect pattern 21 to generate an additional sector group, there is a method in which a threshold value is decreased from 3 to 2. However, the decrease in threshold value increases a possibility that a normal sector will be included in the additional sector group. FIGS. 4(A) and 4(B) are diagrams each illustrating an example in which the threshold value of the detection window 11 is set at 2 for the defect pattern 17 shown in FIG. 2(B) to generate an additional sector group 36. As shown in FIG. 4(A), if only one defect sector 12 is included in the detection window 11, an additional sector group is not generated. However, if two defect sectors 13, 15 or more are included, an additional sector group 16 is generated around the detection window 11 and in the detection window 11.

In FIG. 4(B), in addition to the defect sectors 18, 19, which were the seeds for generating the additional sector group through the detection window 11 as shown in FIG. 2(B), defect sectors 31 through 35 are also treated as seeds of the detection window 11. If the number of additional sectors included in the additional sector group 20 in FIG. 2(B) is compared with that included in the additional sector group 36 in FIG. 4(B), the number of additional sectors in FIG. 2(B) is 96, whereas the number of additional sectors in FIG. 4(B) is 131. If the threshold value of the detection window 11 is set at 2, the number of generated additional sectors becomes so many because it is estimated that the defect registration of normal sectors is also performed.

When generating an additional sector group by use of the detection window 11, it is important to harmonize not performing the defect registration of a normal sector by mistake with performing the defect registration of potential defect sectors without omission. Thus, viewing from this aspect of the detection window 11, trying to decrease the threshold value to generate an additional sector group with the quality assurance being ensured results in more normal sectors included in the additional sector group, whereas trying to increase the threshold value limits variations in defect patterns capable of generating an additional sector group.

If the detection window 11 in FIG. 2(A) is applied to a defect pattern 23 of sectors in FIG. 3, an additional sector group 25 and an additional sector group 27 which are separated from each other are generated. In this case, because the additional sector groups are separated from each other, there is a possibility that a potential defect sector may exist in a part which is judged to be a normal sector. Accordingly, it is necessary to decrease the threshold value of the detection window from 3 to 2 to avoid this possibility, which produces the same problem as that described in FIGS. 4(A) and 4(B).

FIGS. 5(A) and 5(B) are diagrams each illustrating another embodiment of a detection window. FIG. 5(A) illustrates a detection window 51 that is configured as a rectangular area constituted of consecutive sectors: three sectors in the radial direction of a magnetic disk, and two sectors in the circumferential direction. The threshold value of the detection window 51 is set at 2. Incidentally, among six sectors constituting the detection window 51, a sector located at upper left is used for alignment with a defect sector. As is the case with the detection window 11, another sector selected from among the sectors constituting the detection window 51 can also be used for the alignment.

FIG. 5(A) illustrates a state in which if the number of defect sectors included in the detection window 51 is two or more, an additional sector group 66 is generated. The additional sector group 66 is defined as a rectangular sector area formed by providing one sector to each side of the detection window 51 in the circumferential direction of the magnetic disk, and by providing two sectors to each side of the detection window 51 in the radial direction, and then by excluding defect sectors existing in the detection window from a plurality of sectors included in the rectangular sector area. How to define an address of the additional sector group 66 for the detection window 51 is similar to that described in FIGS. 2(A) and 2(B). The size, a shape, and a threshold value, of the detection window, and a range of an additional sector group, are not limited to this example. Because the defect sector 52 does not become a seed, an additional sector group is not generated even if the detection window 51 is applied. However, the defect sectors 53, 55, 57, 59, 62 become seeds, and accordingly the additional sector group 66 is generated.

Figure 6:
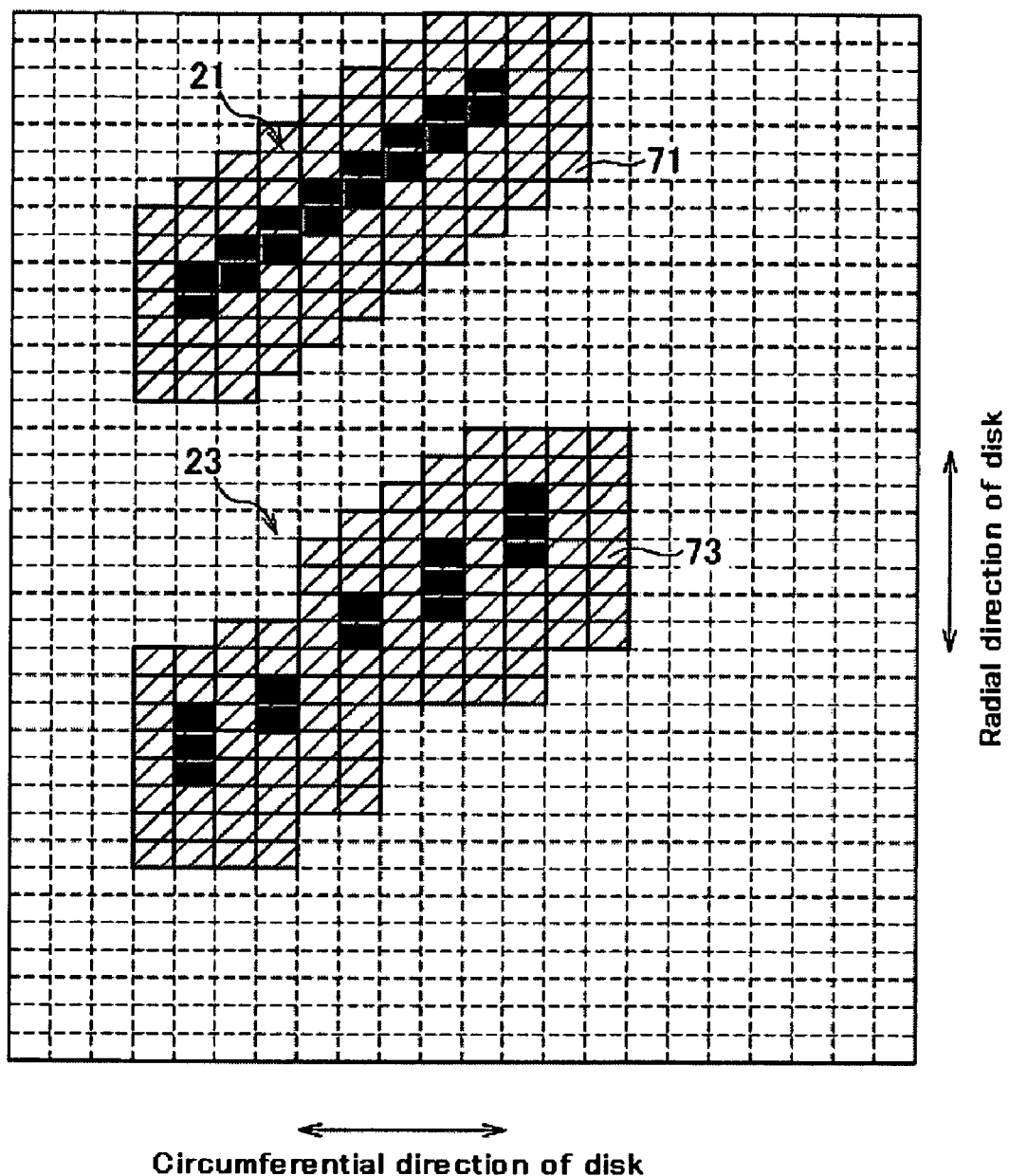
FIG. 6 is a diagram illustrating a state in which a rectangular detection window is applied to the defect patterns 21, 23 of the sectors shown in FIG. 3 to generate additional sector groups.

If the detection window 51 is applied to the defect pattern 17 of the sectors shown in FIG. 2(B) to generate an additional sector group, an additional sector group 67 is generated as shown in FIG. 5(B). The total number of additional sectors in FIG. 5(B) is 82, which is smaller than the total number of additional sectors in FIG. 4(B) that is 131. On the other hand, the additional sector group 67 exhaustively covers a range within which a potential defect sector is expected to exist. In addition, if the detection window 51 is applied to the defect patterns 21, 23 of the sectors shown in FIG. 3, additional sector groups 71, 73 are generated as shown in FIG. 6. Thus, no potential defect sector is excluded from targets of the defect registration, like the case where the detection window 11 is applied (refer to FIG. 3).

Magnetic Disk Drive

Figure 7:
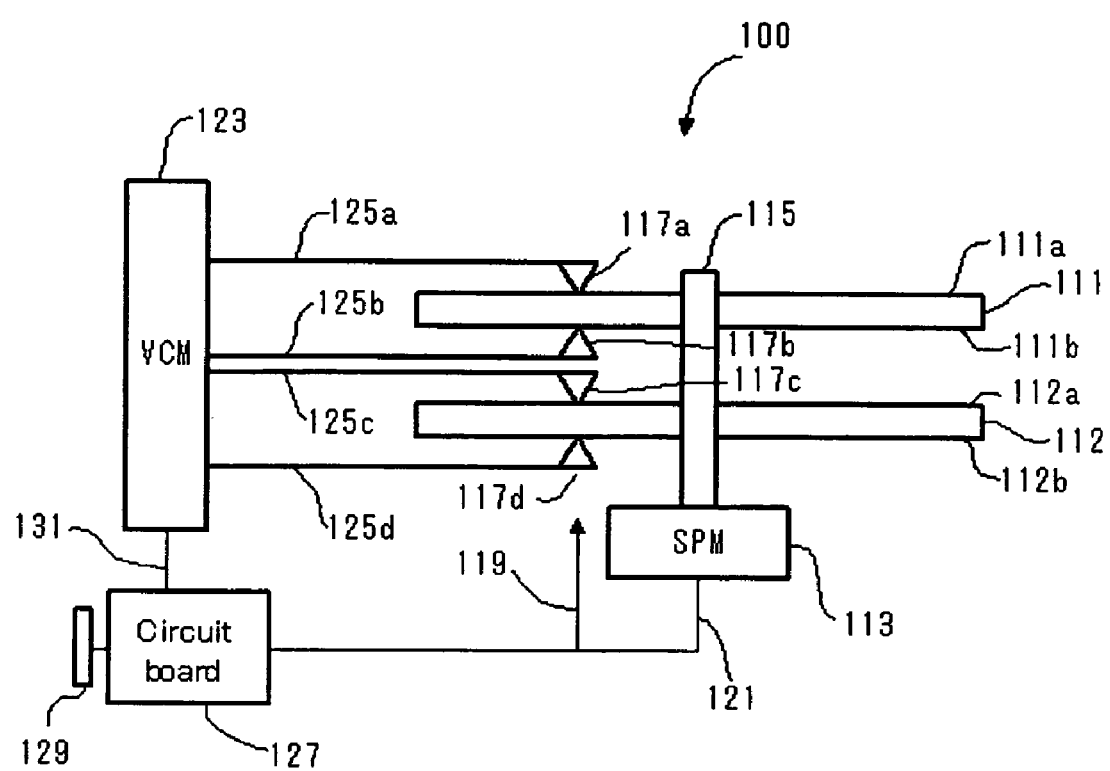
FIG. 7 is a configuration diagram schematically illustrating a magnetic disk drive that executes a defect inspection method according to an embodiment of the invention.
Figure 8:
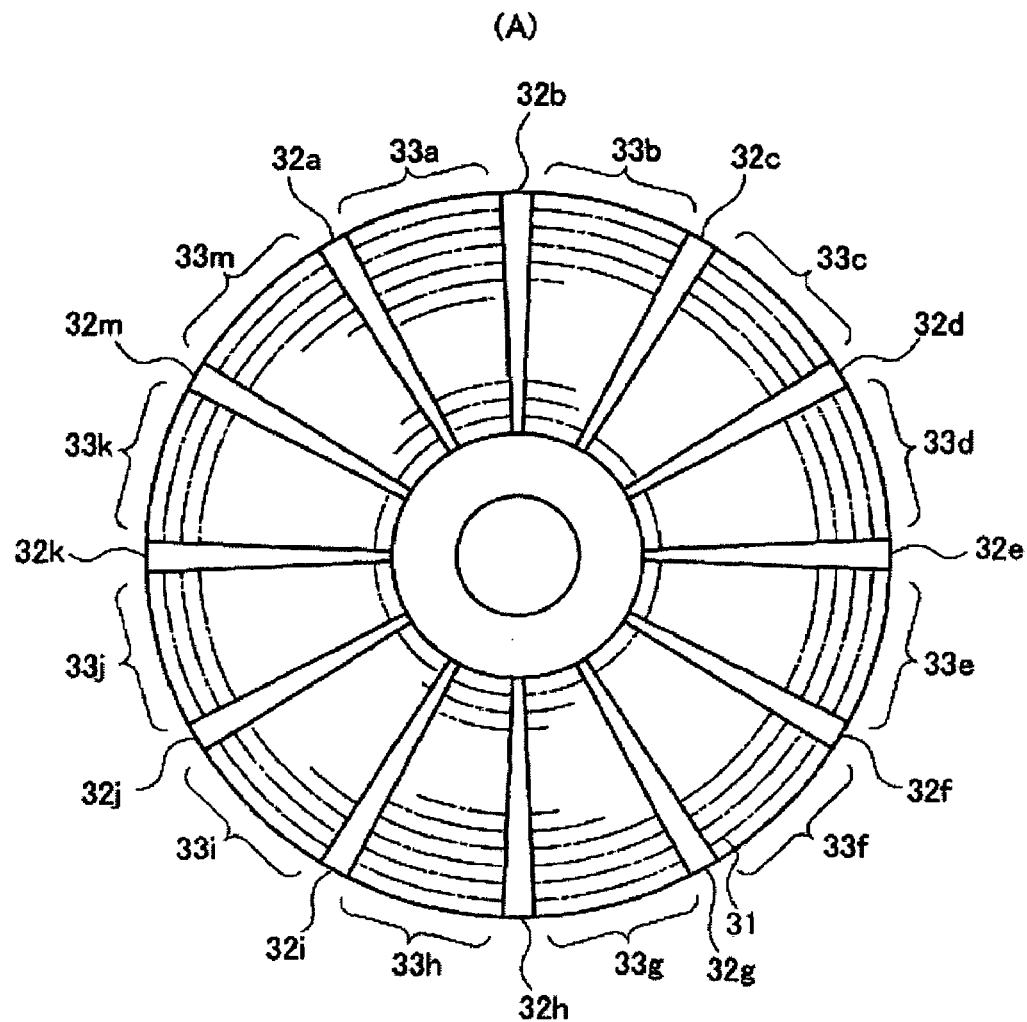
FIGS. 8(A) and 8(B) are diagrams each illustrating a format of recording surfaces of a magnetic disk.
Figure 8:
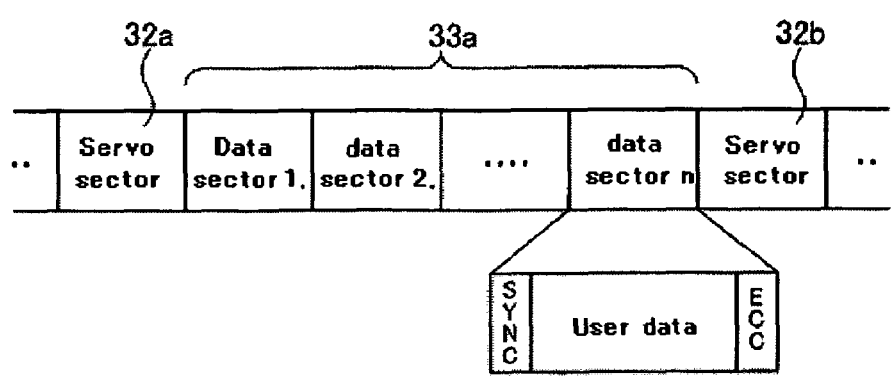
Figure 9:
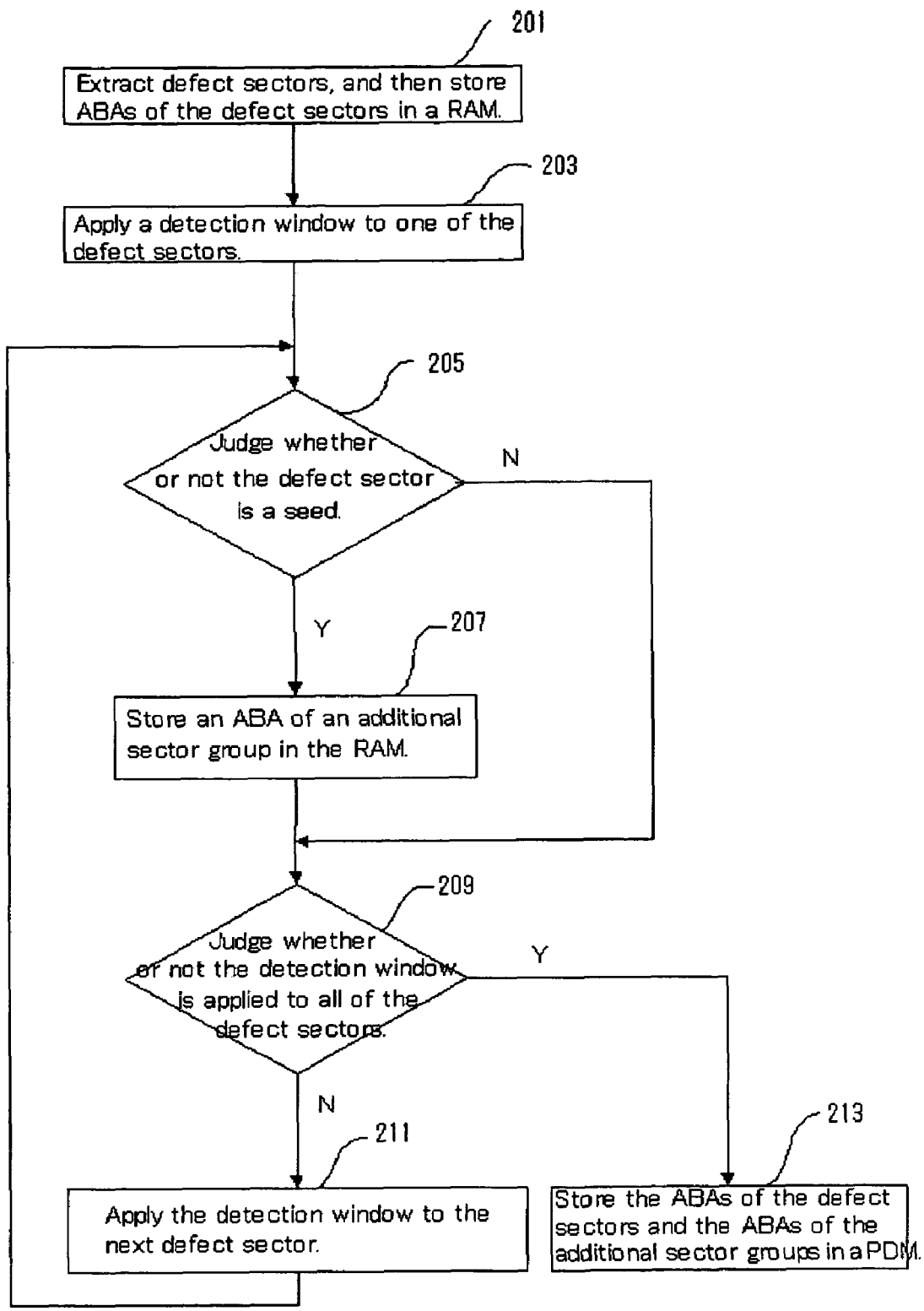
FIG. 9 is a flowchart illustrating a defect registration method according to an embodiment of the invention.

Next, how to perform the defect registration of sectors in a magnetic disk drive will be described with reference to FIGS. 7 through 9. FIG. 7 is a configuration diagram schematically illustrating a magnetic disk drive 100 that executes a defect inspection method according to an embodiment of the present invention. FIGS. 8(A) and 8(B) are diagrams each illustrating a format of recording surfaces 111a, 111b, 112a, 112b of magnetic disks. FIG. 9 is a flowchart illustrating a defect registration method according to an embodiment of the present invention.

The magnetic disk drive 100 includes two magnetic disks 111, 112. The magnetic disk 111 has recording surfaces 111a, 111b, and the magnetic disk 112 has recording surfaces 112a, 112b. The magnetic disks 111, 112 are secured to a spindle shaft 115 at a specified interval. A spindle motor 113 (hereinafter referred to as "SPM") rotates as one unit the spindle shaft 115 and the magnetic disks 111, 112.

The present invention does not limit the number of magnetic disks or the number of recording surfaces. The magnetic disk drive 100 is provided with heads 117a, 117b, 117c, 117d that correspond to the recording surfaces 111a, 111b, 112a, 112b of the magnetic disks 111, 112 respectively. Each head is formed on a slider, and is formed as a composite head including an induction type head for writing and an MR head for reading.

The sliders on which the heads 117a, 117b, 117c, 117d are formed are mounted to suspension assemblies 125a, 125b, 125c, 125d respectively. The suspension assemblies 125a, 125b, 125c, 125d are driven by a voice coil motor 123 (hereinafter referred to as "VCM") so that they are pivotally moved as one unit together with a carriage. As a result, each head is positioned at a desired track that is defined on a corresponding recording surface of the magnetic disk.

The magnetic disk drive 100 further includes a circuit board 127 having an on-board semiconductor device that is used to totally control the operation of the magnetic disk drive 100, and to control data communications with the outside. The circuit board 127 includes a processor (MPU), a RAM, a ROM, an EEPROM, and a read/write channel. The circuit board 127 is connected to the heads 117a, 117b, 117c, 117d, the SPM 113, and the VCM 123 through lines 119, 121, 131. Further, an interface connector 129 used to make connections with external devices is connected to the circuit board 127.

The MPU controls operation of the magnetic disk drive and data communications with the outside, and executes the defect registration of sectors according to the present invention. The RAM stores a program executed by the MPU, and provides a work area. The RAM temporarily stores addresses of defect sectors extracted by a defect detection test. The ROM stores a control program of the magnetic disk drive 100. Information stored in the EEPROM includes: a PDM; a RDM; settings parameters of components including the heads, and the read/write channel, and specific information about the magnetic disk drive. The PDM may also be stored in the magnetic disk. A defect registration program which implements the present invention is stored in the ROM beforehand, or is transmitted from the outside through the interface connector in an inspection process.

Next, a format of the recording surfaces 111a, 111b, 112a, 112b of the magnetic disks 111, 112 will be described with reference to FIGS. 8(A) and 8(B). As shown in FIG. 8(A), a plurality of tracks 31 are concentrically defined on the four recording surfaces of the magnetic disks 111, 112 using servo data. The magnetic disk drive 100 adopts a servo surface data method. Therefore, a plurality of servo sectors 32a through 32m are radially provided from the innermost circumferential track toward the outermost circumferential track. The radial servo sectors are located at equivalent angles in the circumferential direction. Servo data is written to each servo sector. Moreover, tracks are provided with data areas 33a through 33m at locations that are adjacent to the servo sectors 32a through 32m in the circumferential direction respectively. As a result, the servo sector 32a through 32m and the data area 33a through 33m are alternately located in the circumferential direction of the magnetic disk.

Each data area includes a plurality of data sectors. When adopting the zone bit recording that divides all tracks into a plurality of zones in the radial direction of the magnetic disk, the number of data sectors per track in each zone is the same as that in the other zones. FIG. 8(B) is a diagram representatively illustrating servo sectors 32a, 32b and a data area 33a. The servo sector 32a includes servo data having servo AGC, a servo mark, a servo address, and a burst pattern. The servo AGC is used to adjust an amplification factor of a head amplifier so as to keep the amplitude constant before reading out subsequent servo data. The servo mark is a special signal pattern for identifying the start of servo data. As soon as the MPU detects a servo mark, a servo interrupt signal is generated in the read/write channel, causing the read/write channel to read out servo data. The servo address has track location information and servo location information.

The track location information indicates a cylinder number, and is written with a gray code. In contrast to usual binary codes, the gray code is so defined that each increase in value by one changes only one bit pattern. By use of this bit pattern, even if the head/slider flies between a track n and a track n+1 during the seek control, either value can be obtained. The servo location information is information used to identify the plurality of servo sectors 32a through 32m located in the circumferential direction. The burst pattern is used for track following that detects an accurate location of the head/slider relative to a target track so as to position the head/slider at the center of the target track.

As shown in FIG. 8(B), a plurality of data sectors 1 through n are defined in the data area 33a. Each data sector includes: a SYNC pattern that is used when the read/write channel adjusts a gain and achieves synchronization; user data having a length of 512 bytes, which is a data write area and is a unit of read/write, and an ECC area to which an error correction code (ECC) is written, the ECC being used to correct a read error of data.

To identify a location of a data sector in the circumferential direction, the elapsed time after servo data is detected is measured. In addition, a location of a sector may also be identified by including location information of a data sector in the ECC area, or by counting the number of SYNC in a data area after detecting servo data.

An absolute location of a sector on each recording surface can be expressed in a form of: a cylinder number (C), a head number (H) and a sector number (S). The cylinder number is a number that corresponds to a truck number from the viewpoint of each recording surface. The head number is a number for identifying any one of four recording surfaces. The sector number is a number for identifying a location of a sector in each track. A sector location expressed in CHS is called ABA.

Step of Defect Registration

A defect registration method for registering sectors on each recording surface of a magnetic disk will be described with reference to FIG. 9. The MPU of the magnetic disk drive 100 executes a defect registration program to perform the defect registration. However, the defect registration method according to the present invention can also be implemented by controlling the magnetic disk drive 100 from the outside using dedicated test equipment.

In a block 201, a defect detection test is carried out for all sectors of a recording surface, and then ABAs of defect sectors are stored in the RAM. With the object of carrying out the defect detection test, a read/write test is performed for all sectors. When performing the read/write test, inspection data is first written to all sectors. At this time, if servo data could not be read out within a given period of time, all sectors included in a track corresponding to the servo data are judged as defect sectors, and ABAs thereof are then stored in the RAM. Further, the defect registration of all sectors included in a plurality of adjacent tracks is also performed.

Instead of judging as defect sectors on a track basis, sectors in data areas existing on both sides of unreadable servo data may also be judged as defect sectors. To be more specific, in the example shown in FIG. 8(A), if the servo data 32a cannot be read out, sectors in all data blocks included in the data areas 33a, 33m are judged as defect sectors.

Subsequently, the written inspection data is read, and then the read inspection data is compared with the written inspection data. At this time, the number of ECC symbols is made smaller than the number of symbols applied when a user uses, so that the capability of correcting a read error is decreased to increase the detectivity of bit error. A sector, read data of which differs from inspection data, is judged to be a defect sector, and then an ABA thereof is temporarily stored in the RAM.

In a block 203, a detection window is aligned with a defect sector having the smallest ABA. The detection window is not limited to the detection windows that are configured as described in FIGS. 2(A) and 2(B), and 4(A) and 4(B). The detection window can be set as sector areas having various kinds of shapes. What are set for the detection window include: a threshold value used for a defect sector included, and a sector in the detection window, the sector being used to align the detection window with a defect sector. Moreover, a relative address of an additional sector group relative to the detection window is also defined.

In a block 205, the number of defect sectors included in the detection window is calculated, and then a judgment is made as to whether or not the defect sector is a seed. Being a seed means that when applying a detection window to the defect sector, the number of defect sectors included in the detection window is greater than or equal to a threshold value. If the defect sector in question is not judged to be a seed, the process proceeds to a block 209, where a judgment is made as to whether or not the detection window is applied to all of the defect sectors. In the block 205, if the defect sector in question is judged to be a seed, the process proceeds to a block 207, where each address of an additional sector group defined in the detection window is stored in the RAM as an ABA of a sector on the magnetic disk.

Here, if it is detected that the number of defect sectors existing in the same data area of the same track is greater than or equal to the threshold value, the defect registration of all sectors in the data area, and that of all sectors in adjacent data areas, may also be performed instead of generating an additional sector group. For example, paying attention to sectors in the data area 33a of the same track shown in FIG. 8(A), if the number of defect sectors included in the detection window is greater than or equal to the threshold value, the defect registration of all sectors included in the data area 33a, the data area 33m, and the data area 33b may also be performed.

The detection window is applied to a defect sector to calculate the number of defect sectors included in the detection window. Then, an ABA of an additional sector group, which is generated on the basis of the result of the calculation, is stored in the RAM. This series of processing can be easily executed by the MPU of the magnetic disk drive, and does not require the large RAM capacity. Accordingly, it is possible to reduce the production time, and to perform the defect registration in the magnetic disk drive without using dedicated test equipment, which are convenient.

In the block 209, a judgment is made as to whether or not the detection window is applied to all of the defect sectors. If there is a defect sector to which the detection window is not applied, the process proceeds to a block 211, where the detection window is applied to a defect sector pointed to by the next ABA before returning to the block 205. In the block 209, if it is judged that the detection window is applied to all of the defect sectors, the process proceeds to a block 213, where the ABAs of defect sectors and those of additional sectors, which are stored in the RAM, are registered in the PDM. The PDM is a table for storing ABAs of sectors, the defect registration of which has been performed as defect sectors and additional sectors. The PDM is formed in, for example, the EEPROM, or a dedicated area that is not used by users of the magnetic disk.

The ABA of the sector stored in the PDM is used to generate a LBA next time. The LBA is an address used when a host computer makes an access to the magnetic disk drive. The LBAs are numbers that are assigned to all sectors of all cylinders in the order of sector locations. The LBAs are assigned while skipping sectors stored in the PDM. Therefore, even if a sector, the defect registration of which has been performed, exists among sectors, the LBAs in the same track are arranged in the order of the rotation of the magnetic disk. As a result, no rotational delay time occurs when consecutively writing/reading data.

Up to this point, the present invention was described on the basis of the specific embodiments shown in the diagrams. The present invention, however, is not limited to the embodiments illustrated in the diagrams. It is needless to say that so long as the effects of the present invention are produced, any configuration which is known in the past can also be adopted.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A defect registration method for performing defect registration of sectors located on a magnetic disk, said method comprising:
    extracting a plurality of defect sectors from the magnetic disk;
    applying a detection window to each of the defect sectors, said detection window being formed as a sector area constituted of a specified number of sectors, an additional sector group being defined for said detection window, and
    performing the defect registration of an address of the additional sector group, and addresses of the defect sectors included in the detection window, if the number of defect sectors included in the detection window is greater than or equal to a threshold value, and not performing the defect registration of an address of the additional sector group if the number of defect sectors included in the detection window is less than the threshold value.

2. A defect registration method according to claim 1, wherein said detection window is configured as a sector area constituted of the specified number of sectors, said sector area extending in a radial direction of the magnetic disk.

3. A defect registration method according to claim 1, wherein said detection window is configured as a rectangular sector area constituted of m×n sectors, where the number of sectors in a radial direction of the magnetic disk is m, and the number of sectors in a circumferential direction of the magnetic disk is n.

4. A defect registration method according to claim 3, wherein the number of sectors m is 3, and the number of sectors n is 2.

5. A defect registration method according to claim 1, wherein said detection window is configured as a sector area constituted of the specified number of sectors, said sector area extending in a circumferential direction of the magnetic disk.

6. A defect registration method according to claim 1, wherein the extension of said additional sector group is formed in a rectangular shape surrounding the detection window.

7. A defect registration method according to claim 1, wherein each sector constituting the additional sector group is defined for the detection window as a relative address relative to the detection window.

8. A defect registration method according to claim 1, wherein applying the detection window includes applying the detection window to all of the defect sectors in order.

9. A defect registration method according to claim 1, wherein extracting the defect sectors includes writing inspection data to the sectors and reading the written inspection data.

10. A defect registration method according to claim 1, wherein:
    extracting the defect sectors includes detecting a defect of servo data written to the magnetic disk, and
    performing the defect registration includes performing the defect registration of the sectors on a data track basis, said data track corresponding to the servo data including the defect.

11. A defect registration method according to claim 1, wherein extracting the defect sectors includes storing the defect sectors in a RAM of a magnetic disk drive equipped with the magnetic disk.

12. A defect registration method according to claim 1, wherein performing the defect registration includes, if the number of defect sectors existing in the same track is greater than or equal to the threshold value, performing the defect registration of all sectors included in data areas existing on both sides of servo data to which the defect sector corresponds.

13. A defect registration method according to claim 1, wherein performing the defect registration includes performing the defect registration in a primary defect map provided in a magnetic disk drive equipped with the magnetic disk.

14. A defect registration method according to claim 1, wherein a processor of the magnetic disk drive performs each step of the defect registration method by executing a defect registration program stored in the magnetic disk drive.

15. A magnetic disk drive comprising:
    a magnetic disk on which sectors are arranged;
    a head for reading/writing data from/to the sectors;
    a suspension assembly equipped with the head, said suspension assembly positioning the head at a specified location on the magnetic disk;
    a storage medium configured to store a defect registration program, and
    a processor configured to control operation of the magnetic disk drive,
    wherein, by use of a defect registration program, said processor is configured to:
    extract a plurality of defect sectors from the magnetic disk;
    apply a detection window to each of the defect sectors, said detection window being formed as a sector area constituted of the specified number of sectors, an additional sector group being defined for said detection window, and
    perform the defect registration of an address of the additional sector group, and addresses of the defect sectors included in the detection window, if the number of defect sectors included in the detection window is greater than or equal to a threshold value, and do not perform the defect registration if the number of defect sectors included in the detection window is less than the threshold value.

16. A magnetic disk drive according to claim 15, wherein said detection window is configured as a rectangular sector area constituted of m×n sectors, where the number of sectors in a radial direction of the magnetic disk is m, and the number of sectors in a circumferential direction of the magnetic disk is n.

17. A magnetic disk drive according to claim 15, wherein a primary defect map for storing addresses of the sectors, the defect registration of which has been performed, is included.

18. A defect registration method for performing defect registration of sectors located on a magnetic disk, said method comprising:

extracting a plurality of defect sectors from the magnetic disk;

calculating the total number of defect sectors located within a specified range including the defect sector, and performing the defect registration of addresses of sectors existing around the specified range, and addresses of sectors existing within the specified range, if said calculated number of defect sectors is greater than or equal to a specified value, and not performing defect registration if said calculation number of defect sectors is less than the specified value;

wherein the specified value is two or more.

* * * * *

UNITED STATES PATENT AND TRADEMARK OFFICE
CERTIFICATE OF CORRECTION

| | | |
|---|---|---|
| PATENT NO. | : 7,583,461 B2 | Page 1 of 1 |
| APPLICATION NO. | : 11/223068 | |
| DATED | : September 1, 2009 | |
| INVENTOR(S) | : Kudoh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 45 days.

Signed and Sealed this

Fourteenth Day of September, 2010

David J. Kappos
*Director of the United States Patent and Trademark Office*